United States Patent
Koch et al.

(10) Patent No.: US 10,592,548 B2
(45) Date of Patent: Mar. 17, 2020

(54) IMAGE SEARCH PERSONA TECHNIQUES AND SYSTEMS

(71) Applicant: Adobe Inc., San Jose, CA (US)

(72) Inventors: Zeke Koch, San Francisco, CA (US); Baldo Faieta, San Francisco, CA (US); Jen-Chan Chien, Saratoga, CA (US); Mark M. Randall, Folsom, CA (US); Olivier Sirven, Paris (FR); Philipp Koch, Park City, UT (US); Dennis G. Nicholson, Atherton, CA (US)

(73) Assignee: Adobe Inc., San Jose, CA (US)

( * ) Notice: Subject to any disclaimer, the term of this patent is extended or adjusted under 35 U.S.C. 154(b) by 75 days.

(21) Appl. No.: 14/828,085

(22) Filed: Aug. 17, 2015

(65) Prior Publication Data

US 2017/0053103 A1 Feb. 23, 2017

(51) Int. Cl.
*G06F 16/58* (2019.01)
*G06F 21/10* (2013.01)

(52) U.S. Cl.
CPC .............. *G06F 16/58* (2019.01); *G06F 21/10* (2013.01); *G06F 2221/0713* (2013.01)

(58) Field of Classification Search
CPC ............... G06F 21/10; G06F 17/30277; G06F 17/30265; G06F 2221/0713; G06F 16/58
See application file for complete search history.

(56) References Cited

U.S. PATENT DOCUMENTS

| | | | |
|---|---|---|---|
| 5,696,964 A | 12/1997 | Cox et al. | |
| 6,012,073 A | 1/2000 | Arend et al. | |
| 6,157,435 A | 12/2000 | Slater et al. | |
| 6,483,570 B1 | 11/2002 | Slater | |
| 6,574,616 B1 | 6/2003 | Saghir | |
| 6,629,104 B1* | 9/2003 | Parulski | G06F 17/30265 348/231.2 |
| 6,859,802 B1 | 2/2005 | Rui | |
| 6,873,327 B1 | 3/2005 | Edwards et al. | |
| 6,901,378 B1 | 5/2005 | Linker et al. | |
| 6,941,294 B2 | 9/2005 | Flank | |
| 7,047,413 B2 | 5/2006 | Yacobi et al. | |
| 7,113,921 B2 | 9/2006 | Linker | |

(Continued)

OTHER PUBLICATIONS

"Pre-Interview Communication", U.S. Appl. No. 14/827,670, dated Feb. 17, 2017, 3 pages.

(Continued)

*Primary Examiner* — Cheng-Feng Huang
(74) *Attorney, Agent, or Firm* — SBMC (57) ABSTRACT

Image search persona techniques and systems are described. In one or more implementations, a digital medium environment is described for controlling image searches by one or more computing devices. An image search request and an indication of one or more personas of one or more respective users associated with the image search request is received by the one or more computing devices. The one or more personas specify characteristics of the one or more respective users themselves. A plurality of images are obtained by the one or more computing devices based on the image search request. The plurality of images are filtered by the one or more computing devices based on the one or more personas and a search result is generated by the one or more computing devices from the filtered plurality of images.

21 Claims, 8 Drawing Sheets

(56) References Cited

U.S. PATENT DOCUMENTS

| | | | |
|---|---|---|---|
| 7,127,106 B1 | 10/2006 | Neil et al. | |
| 7,249,034 B2 | 7/2007 | Schirmer | |
| 7,286,723 B2 | 10/2007 | Taugher et al. | |
| 7,460,737 B2 | 12/2008 | Shuster | |
| 7,492,921 B2 | 2/2009 | Foote et al. | |
| 7,493,340 B2 | 2/2009 | Rui | |
| 7,523,102 B2 | 4/2009 | Bjarnestam et al. | |
| 7,574,378 B2 | 8/2009 | Lipowitz et al. | |
| 7,613,686 B2 | 11/2009 | Rui | |
| 7,689,620 B2 | 3/2010 | Tan | |
| 7,725,398 B2 | 5/2010 | Dawson et al. | |
| 7,783,624 B2 | 8/2010 | Martinez et al. | |
| 7,797,377 B2 | 9/2010 | Linker et al. | |
| 7,808,555 B2 | 10/2010 | Aratani et al. | |
| 7,818,261 B2 | 10/2010 | Weiskoph et al. | |
| 7,920,760 B2 | 4/2011 | Yoda | |
| 7,929,810 B2 | 4/2011 | Shuster | |
| 7,933,765 B2 | 4/2011 | Summerlin et al. | |
| 7,940,959 B2 | 5/2011 | Rubenstein | |
| 7,949,625 B2 | 5/2011 | Brough et al. | |
| 7,961,938 B1 | 6/2011 | Remedios | |
| 7,996,266 B2 | 8/2011 | Gura | |
| 8,041,612 B1 | 10/2011 | Treyz | |
| 8,073,828 B2 | 12/2011 | Bowden et al. | |
| 8,144,995 B2 | 3/2012 | Thompson | |
| 8,155,382 B2 | 4/2012 | Rubenstein | |
| 8,219,494 B1 | 7/2012 | Pride et al. | |
| 8,229,800 B2 | 7/2012 | Trotman et al. | |
| 8,285,082 B2 | 10/2012 | Heck | |
| 8,285,084 B2 | 10/2012 | Yoda | |
| 8,341,195 B1 | 12/2012 | Cole et al. | |
| 8,380,005 B1* | 2/2013 | Jonsson | G06T 11/60 |
| | | | 382/282 |
| 8,396,331 B2 | 3/2013 | Jia et al. | |
| 8,412,568 B2 | 4/2013 | Bastos et al. | |
| 8,417,000 B1 | 4/2013 | Mendis | |
| 8,452,049 B2 | 5/2013 | Rubenstein | |
| 8,504,547 B1 | 8/2013 | Yee et al. | |
| 8,515,139 B1 | 8/2013 | Nechyba et al. | |
| 8,560,455 B1 | 10/2013 | Raman et al. | |
| 8,571,329 B2 | 10/2013 | Thompson | |
| 8,582,872 B1 | 11/2013 | Loffe Sergey et al. | |
| 8,620,905 B2 | 12/2013 | Ellsworth | |
| 8,625,887 B2 | 1/2014 | Li | |
| 8,644,646 B2 | 2/2014 | Heck | |
| 8,688,586 B2 | 4/2014 | Pride et al. | |
| 8,699,826 B2 | 4/2014 | Remedios | |
| 8,774,529 B2 | 7/2014 | Rubenstein et al. | |
| 8,792,685 B2 | 7/2014 | Sangster | |
| 8,812,392 B2 | 8/2014 | Shahghasemi | |
| 8,831,998 B1 | 9/2014 | Cramer et al. | |
| 8,879,837 B2 | 11/2014 | Usher | |
| 8,898,171 B2 | 11/2014 | Tan | |
| 8,934,717 B2 | 1/2015 | Newell et al. | |
| 9,071,662 B2 | 6/2015 | Svendsen et al. | |
| 9,489,400 B1* | 11/2016 | Haitani | G06F 17/30247 |
| 9,715,714 B2 | 7/2017 | Koch et al. | |
| 9,824,463 B2 | 11/2017 | Ingrassia et al. | |
| 9,858,244 B1 | 1/2018 | Bjorkegren | |
| 9,911,172 B2 | 3/2018 | Koch et al. | |
| 10,366,433 B2 | 7/2019 | Koch et al. | |
| 10,475,098 B2 | 11/2019 | Koch et al. | |
| 2002/0033844 A1* | 3/2002 | Levy | G06F 21/10 |
| | | | 715/744 |
| 2003/0151611 A1* | 8/2003 | Turpin | G06F 3/0481 |
| | | | 345/589 |
| 2004/0202349 A1 | 10/2004 | Erol et al. | |
| 2005/0010553 A1 | 1/2005 | Liu | |
| 2006/0204142 A1 | 9/2006 | West et al. | |
| 2007/0097959 A1* | 5/2007 | Taylor | G06F 21/10 |
| | | | 370/352 |
| 2007/0133947 A1* | 6/2007 | Armitage | G06F 17/30256 |
| | | | 386/224 |
| 2007/0168513 A1 | 7/2007 | Weiskopf et al. | |
| 2007/0208670 A1* | 9/2007 | Quoc | G06F 21/10 |
| | | | 705/59 |
| 2007/0297683 A1 | 12/2007 | Luo et al. | |
| 2009/0083236 A1* | 3/2009 | Shuster | G06F 17/30265 |
| 2009/0160859 A1 | 6/2009 | Horowitz | |
| 2009/0287669 A1* | 11/2009 | Bennett | G06F 17/30265 |
| 2010/0070342 A1 | 3/2010 | Hu et al. | |
| 2010/0306344 A1 | 12/2010 | Athas et al. | |
| 2011/0029408 A1 | 2/2011 | Shusterman et al. | |
| 2011/0167059 A1 | 7/2011 | Fallah | |
| 2011/0270697 A1* | 11/2011 | Sunkada | G06F 17/30247 |
| | | | 705/26.1 |
| 2012/0094639 A1 | 4/2012 | Carlson et al. | |
| 2012/0120097 A1* | 5/2012 | Sun | G06F 17/30265 |
| | | | 345/619 |
| 2012/0128239 A1 | 5/2012 | Goswami et al. | |
| 2012/0179673 A1 | 7/2012 | Kelly et al. | |
| 2013/0019257 A1 | 1/2013 | Tschernutter et al. | |
| 2013/0080881 A1 | 3/2013 | Goodspeed et al. | |
| 2013/0117258 A1* | 5/2013 | Linsley | G06F 17/30864 |
| | | | 707/722 |
| 2013/0167105 A1 | 6/2013 | Goldman et al. | |
| 2013/0215116 A1 | 8/2013 | Siddique et al. | |
| 2013/0335582 A1 | 12/2013 | Itasaki et al. | |
| 2014/0019264 A1 | 1/2014 | Wachman et al. | |
| 2014/0046792 A1* | 2/2014 | Ganesan | G06Q 30/0611 |
| | | | 705/26.4 |
| 2014/0114962 A1 | 4/2014 | Rosenburg et al. | |
| 2014/0122283 A1* | 5/2014 | Mehra | G06F 17/30277 |
| | | | 705/26.1 |
| 2014/0189525 A1 | 7/2014 | Trevisiol et al. | |
| 2014/0201227 A1 | 7/2014 | Hamilton-Dick et al. | |
| 2014/0245358 A1 | 8/2014 | Kumar et al. | |
| 2014/0289134 A1 | 9/2014 | Sutton | |
| 2014/0310264 A1* | 10/2014 | D'Ambrosio | G06F 17/30265 |
| | | | 707/722 |
| 2014/0324838 A1* | 10/2014 | Sako | G06F 17/30256 |
| | | | 707/722 |
| 2014/0351021 A1 | 11/2014 | Higbie | |
| 2014/0351284 A1* | 11/2014 | Ikonomov | G06F 17/30867 |
| | | | 707/770 |
| 2014/0365463 A1* | 12/2014 | Tusk | G06F 17/30247 |
| | | | 707/711 |
| 2015/0018094 A1* | 1/2015 | Watari | A63F 13/355 |
| | | | 463/31 |
| 2015/0058998 A1* | 2/2015 | Yu | G06F 21/10 |
| | | | 726/26 |
| 2015/0106628 A1 | 4/2015 | Holman et al. | |
| 2015/0161258 A1 | 6/2015 | Yee et al. | |
| 2015/0234864 A1 | 8/2015 | Kruckemeier | |
| 2015/0324394 A1* | 11/2015 | Becker | G06F 17/30554 |
| | | | 707/733 |
| 2015/0347369 A1 | 12/2015 | Babon et al. | |
| 2015/0363503 A1 | 12/2015 | Scheuerman | |
| 2016/0035055 A1 | 2/2016 | Perkins et al. | |
| 2016/0180193 A1 | 6/2016 | Masters et al. | |
| 2016/0196589 A1 | 6/2016 | Subbarayan | |
| 2016/0226984 A1 | 8/2016 | Kelly et al. | |
| 2016/0239680 A1* | 8/2016 | Holz | G06F 16/2455 |
| 2016/0253707 A1 | 9/2016 | Momin et al. | |
| 2016/0314203 A1 | 10/2016 | Wickenkamp | |
| 2016/0370973 A1 | 12/2016 | Morgan et al. | |
| 2017/0034286 A1 | 2/2017 | Kirschner | |
| 2017/0052981 A1 | 2/2017 | Koch et al. | |
| 2017/0053104 A1 | 2/2017 | Koch et al. | |
| 2017/0053189 A1 | 2/2017 | Koch et al. | |
| 2017/0053332 A1 | 2/2017 | Koch et al. | |
| 2017/0053365 A1 | 2/2017 | Koch et al. | |
| 2017/0053372 A1 | 2/2017 | Koch et al. | |
| 2017/0221171 A1 | 8/2017 | Koch et al. | |

OTHER PUBLICATIONS

"Pre-Interview Communication", U.S. Appl. No. 14/827,836, dated Jan. 26, 2017, 4 pages.

"Pre-Interview Communication", U.S. Appl. No. 14/827,974, dated Mar. 1, 2017, 3 pages.

(56) References Cited

OTHER PUBLICATIONS

"Final Office Action", U.S. Appl. No. 14/827,836, dated Jul. 14, 2017, 24 pages.
"Notice of Allowance", U.S. Appl. No. 14/827,974, dated Apr. 19, 2017, 7 pages.
"Pre-Interview Communication", U.S. Appl. No. 15/491,943, dated Sep. 14, 2017, 3 pages.
"First Action Interview Office Action", U.S. Appl. No. 14/827,670, dated Aug. 29, 2017, 4 pages.
"Notice of Allowance", U.S. Appl. No. 15/491,943, dated Oct. 24, 2017, 6 pages.
"Final Office Action", U.S. Appl. No. 14/827,670, dated Feb. 1, 2018, 29 pages.
"Non-Final Office Action", U.S. Appl. No. 14/827,836, dated Apr. 4, 2018, 26 pages.
"Restriction Requirement", U.S. Appl. No. 14/827,645, dated Jun. 18, 2018, 6 pages.
"Supplemental Notice of Allowance", U.S. Appl. No. 15/491,943, dated Feb. 6, 2018, 2 pages.
"Examiner's Answer to Appeal Brief", U.S. Appl. No. 14/827,670, dated Nov. 28, 2018, 8 pages.
"Final Office Action", U.S. Appl. No. 14/827,836, dated Oct. 30, 2018, 14 pages.
"Non-Final Office Action", U.S. Appl. No. 14/827,645, dated Oct. 29, 2018, 12 pages.
"Pre-Interview First Office Action", U.S. Appl. No. 14/827,645, date Nov. 5, 2018, 3 pages.
"First Action Interview Office Action", U.S. Appl. No. 14/827,600, dated Sep. 24, 2018, 3 pages.
"Pre-Interview First Office Action", U.S. Appl. No. 14/827,583, dated Oct. 5, 2018, 5 pages.
"Pre-Interview First Office Action", U.S. Appl. No. 14/827,600, dated Aug. 10, 2018, 3 pages.
"Restriction Requirement", U.S. Appl. No. 14/827,583, dated Jul. 19, 2019, 6 pages.
"Non-Final Office Action", U.S. Appl. No. 14/827,583, dated Jul. 29, 2019, 26 pages.
"Non-Final Office Action", U.S. Appl. No. 14/827,600, dated Sep. 4, 2019, 10 pages.
"Notice of Allowance", U.S. Appl. No. 14/827,645, dated Jun. 26, 2019, 12 pages.
"Supplemental Notice of Allowance", U.S. Appl. No. 14/827,836, dated Jun. 21, 2019, 2 pages.
"Final Office Action", U.S. Appl. No. 14/827,583, dated Mar. 8, 2019, 25 pages.
"Final Office Action", U.S. Appl. No. 14/827,600, dated Apr. 25, 2019, 10 pages.
"Final Office Action", U.S. Appl. No. 14/827,645, dated Mar. 13, 2019, 12 pages.
"Non-Final Office Action", U.S. Appl. No. 14/827,600, dated Apr. 22, 2019, 11 pages.
"Notice of Allowance", U.S. Appl. No. 14/827,836, dated Mar. 13, 2019, 10 pages.
Trevisiol,"Image Ranking Based on User Browsing Behavior", SIGIR '12 Proceedings of the 35th international ACM SIGIR conference on Research and development in information retrieval, ACM ISBN: 978-1-4503-1472-5, Aug. 16, 2012, 10 pages.

\* cited by examiner

702
Detect one or more inputs received via interaction with a user interface by the one or more computing devices that specify keywords as part of an image search request

704
Detect one or more inputs by the one or more computing devices that indicate one or more personas of one or more respective users associated with the image search request, the one or more personas specifying characteristics of the one or more respective users as associated with a demographic of a subset of a population of users

706
Transform the user interface by the one or more computing devices to include an image search result having a plurality of images that are located based on the keywords and filtered based on the indicated one or more personas

IMAGE SEARCH PERSONA TECHNIQUES AND SYSTEMS

BACKGROUND

Content sharing services have been developed as a technique to provide an online marketplace for creative professionals to sell content, such as images. A creative professional, for instance, may capture or create images that are exposed via the content sharing services to potential customers such as marketing professionals, casual users, and so on. For example, a creative professional may capture an image of coworkers conversing at a conference table. The image is then uploaded and tagged for availability as part of the content sharing service such that a marketing professional performing a search for "office" and "meeting" may locate the image. The content sharing service also includes functionality to make the image available for licensing in response to payment of a fee, e.g., as part of a subscription service, pay per use, and so forth.

In a digital online marketplace, images are typically obtained from the content sharing service as part of content creation, such as for inclusion as part of a presentation, a marketing campaign, and so forth. Accordingly, potential uses of images may vary as greatly as the content that includes the images, and thus so too potential consumers of the images. For example, an image of a meeting included as part of an office presentation may have different characteristics than an image of a meeting to be used as part of a coffeehouse marketing pamphlet. Conventional search techniques, however, did not provide a mechanism to readily address these distinctions, which could be frustrating and prone to error and thus conventional digital online marketplaces could lose both customers and creative professionals.

SUMMARY

Image search persona techniques and systems are described. In one or more implementations, a digital medium environment is described for controlling image searches by one or more computing devices. An image search request and an indication of one or more personas of one or more respective users associated with the image search request is received by the one or more computing devices. The one or more personas specify characteristics of the one or more respective users themselves. A plurality of images are obtained by the one or more computing devices based on the image search request. The plurality of images are filtered by the one or more computing devices based on the one or more personas and a search result is generated by the one or more computing devices from the filtered plurality of images.

In one or more implementations, a digital medium environment is described for controlling image searches by one or more computing devices. One or more inputs received via interaction with a user interface are detected by the one or more computing devices that specify keywords as part of an image search request. One or more inputs are also detected by the one or more computing devices that indicate one or more personas of one or more respective users associated with the image search request. The one or more personas specify characteristics of the one or more respective users as associated with a demographic of a subset of a population of users. The user interface is transformed by the one or more computing devices to include an image search result having a plurality of images that are located based on the keywords and filtered based on the indicated one or more personas.

In one or more implementations, a digital medium environment is described for controlling image searches that includes a system. The system includes an image search module implemented at least partially in hardware and configured to obtain a plurality of images that are available for licensing from the content sharing service based on keywords of an image search request to generate an image search result. The system also includes a persona manager module implemented at least partially in hardware and configured to filter the plurality of images for inclusion in the image search result based on an indication of one or more personas of one or more respective users associated with the image search request, the one or more personas specifying characteristics of the one or more respective users themselves.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Content sharing services are configured to unite content from creative professionals with consumers of the content, such as marketers. An example of this is the content sharing service Adobe Stock™ by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two.

In a digital environment, techniques and systems are described that introduce personas as part of a search for images available for licensing from the content sharing service in order to improve user interaction with the service. Personas are used to represent characteristics of users as associated with a demographic of a subset of a user population and thus may be used to represent different users that may be associated with an image search. Personas, for instance, may be representative of content consumption characteristics of the different sub-sets of the population, such as a hipster or other social characteristics, type of job (e.g., business professional, artist), age demographic (e.g., pre-teen, elderly), geographical locale (e.g., by continent, region of a country) past purchase habits and monitored interactions, and so on. Thus, personas may be used to describe characteristics of the subset of the population that are usable to identify likes and dislikes of this population in relation to images and other content presented to them for consumption.

The personas are then used to represent different content consumption characteristics of users that are associated with the search. In order to perform a search for an image to be included in a marketing campaign, for example, a first persona may be associated with the search request of a content creation professional that originates the search request. An additional persona may also be associated with the search request of a marketing professional that requested creation of the content. Further personas may also be associated with the search request, such as that of a marketing client that requested the creation of a marketing campaign by the marketing professional, a target audience of the marketing campaign, and so on. In this way, an originator of the search may address differing characteristics of sub-sets populations that are associated with the search, and more particularly with a potential result of the search. Accordingly, the techniques described herein may address characteristics beyond just the originator of the search itself but also potential consumers and users of a result of the search, e.g., from creation, purchase, and even consumption. This is not possible using conventional techniques that forced users to "make a best guess" as to these characteristics which is inefficient and often prone to error.

In the following discussion, an example environment is first described that is configured to employ the persona techniques described herein. Example procedures are then described which may be performed in the example environment as well as other environments. Consequently, performance of the example procedures is not limited to the example environment and the example environment is not limited to performance of the example procedures.

Example Environment

Figure 1:
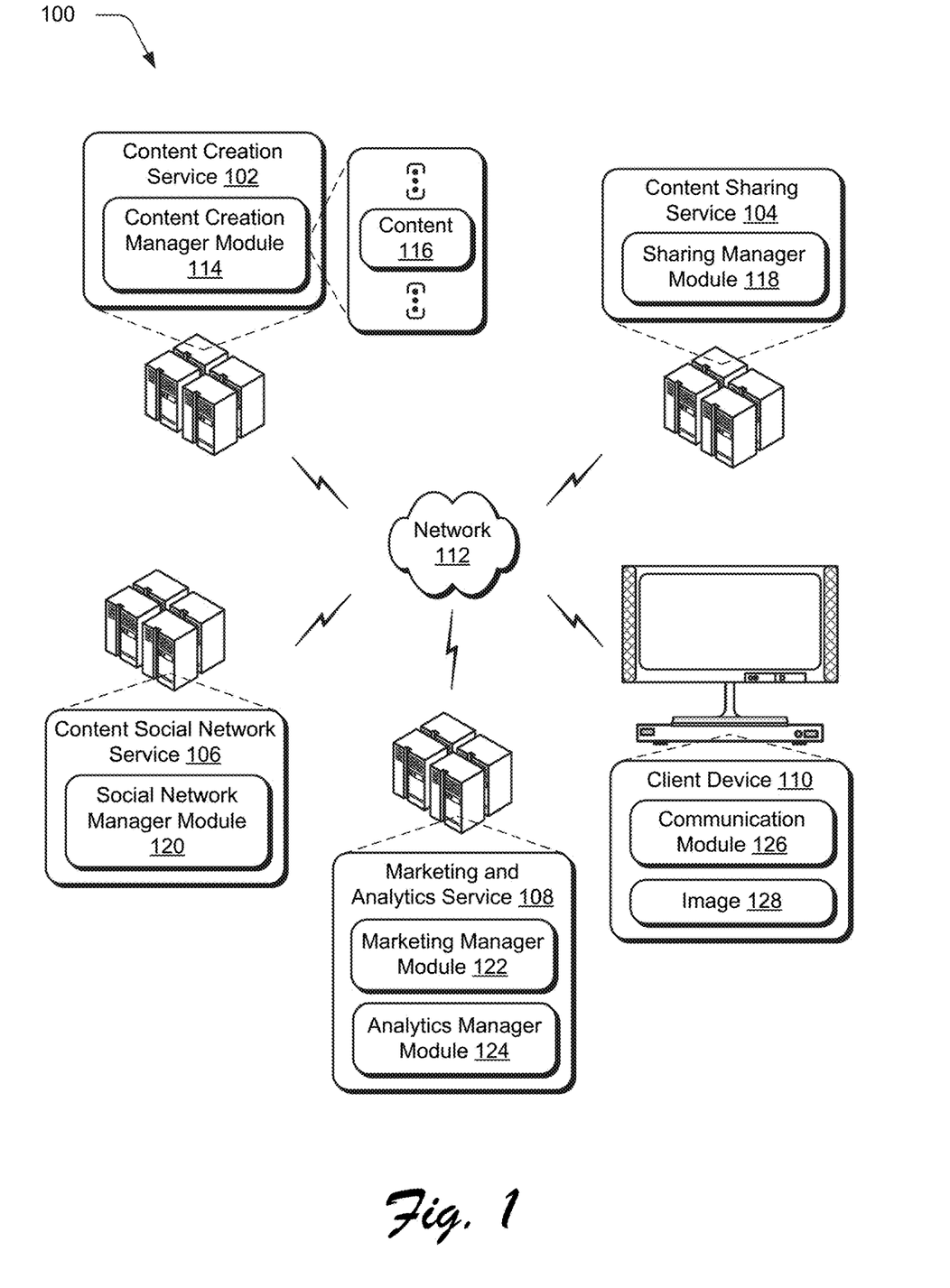
FIG. 1 is an illustration of an environment in an example implementation that is operable to employ content sharing and creation service persona techniques described herein.

FIG. 1 is an illustration of a digital environment 100 in an example implementation that is operable to employ persona techniques described herein. A digital medium environment is illustrated that is configured to generate and control suggestions usable to guide content creation. The illustrated environment 100 includes a content creation service 102, a content sharing service 104, a content social network service 106, a marketing and analytics service 108, and a client device 110 that are communicatively coupled, one to another, via a network 112. Although illustrated separately, functionality represented by the content creation service 102, the content sharing service 104, the content social network service 106, and the marketing and analytics service 108 are also combinable into a single entity, may be further divided across other entities that are communicatively coupled via the network 112, and so on.

Computing devices that are used to implement the content creation service 102, the content sharing service 104, the content social network service 106, the marketing and analytics service 108, and the client device 110 are configurable in a variety of ways. Computing devices, in one such instance, are configured as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource device with limited memory and/or processing resources (e.g., mobile devices). Additionally, although a single computing device is shown in some instances, computing devices are also representative of a plurality of different devices, such as multiple servers utilized by a business to perform operations "over the cloud" as shown for the content creation service 102, the content sharing service 104, the content social network service 106, the marketing and analytics service 108, further discussion of which may be found in relation to FIG. 8.

The content creation service 102 is illustrated as including a content creation manager module 114 that is representative of functionality that is available via the network 112 to create and store content 116. The content creation manager module 114 provides a variety of functionality that is related to the creation of content 116. Examples of this functionality include graphic design, video editing, web development, image creation and processing, sound data processing, photography, and so forth. For example, functionality supported by the content creation manager module 114 includes digital motion graphics and compositing applications, digital audio editors, GUI web development application, animation design, web design, multimedia authoring applications, application-authoring applications, a vector graphics editor, desktop publishing applications, webpage and web development applications, raster-graphics editing applications, a real-time timeline-based video editing application, and so forth.

The content sharing service 104 includes a sharing manager module 118. The sharing manager module 118 is representative of functionality to unite content of creative professionals with consumers of the content, such as marketers, via an online service. An example of this is the content sharing service Fotolia® by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two. Functionality of the sharing manager module 118 may include support of searches to locate desired images, pricing techniques, digital rights management (DRM), and generation of content creation suggestions, further discussion of which begins in relation to FIG. 2 in the following.

The content social network service 106 as illustrated includes a social network manager module 120 that is representative of functionality to implement and manage a content social network service. An example of this is an online social-media based portfolio service for content creators (e.g., Behance®) that is usable by consumers to locate content professionals through examples of content created by the professionals.

The environment 100 also includes a marketing and analytics service 108. The marketing and analytics service 108 includes a marketing manager module 122 that is representative of functionality involving creation and tracking of marketing campaigns and the analytics manager module 124 is representative of functionality to analyze "big data," e.g., posts from a social network service. For example, marketing activities may be utilized to increase awareness of a good or service. This includes making potential consumers aware of the good or service as well as making the potential consumers aware of characteristics of the good or service, even if the potential consumers already own the good. An advertiser, for instance, generates a marketing activity to indicate functionality that is available from the good or service to increase usage and customer satisfaction.

Marketing activities take a variety of different forms, such as online marketing activities may involve use of banner ads, links, webpages, online videos, communications (e.g., emails, status posts, messaging), and so on that may be accessed via the Internet or otherwise. Marketing activities are also be configured for use that does not involve the Internet, such a physical flyers, television advertising, printed advertisements, billboard display (e.g., at a sporting event or along a side of a road), and so forth.

The marketing manager module 122 includes functionality to configure content 116 for inclusion as part of a marketing activity as well as track deployment of the content 116 as part of the marketing activity. The marketing manager module 122, for instance, may embed digital rights management functionality (e.g., a tracking monitor) to track the deployment of the content 116, e.g., to determine a number of times accessed by potentials customers, how and when accessed, identities of who accessed the content, and so forth as processed by the analytics manager module 124.

The client device 110 is illustrated as including a communication module 126 that is representative of functionality to access the content creation service 104, content sharing service 104, content social network service 106, marketing and analytics service 108, and/or content 116 (e.g., available at an online store) via the network 112. The communication module 126, for instance, may be configured as a browser, a web-enabled application, and so on. As such the client device 110 may be utilized by creative professionals to create the content 116, consumers of the content sharing service 104 to gain rights to use the content 116 (e.g., marketers), consume the content 116 (e.g., as part of viewing a marketing activity), and so forth.

As part of content creation, the client device 110 may obtain an image 128 for inclusion as part of the content from a variety of sources. For example, the image 128 may be obtained from the content creation service 102, the content sharing service 104, and so on. In the following, techniques and system are described to support image searches through the use of personas that represent users associated with the search, such as an originator, a target audience, a client, and so forth. Having now described an environment that is usable to implement the techniques described herein, examples of the content creation and licensing techniques are described in the following.

Figure 2:
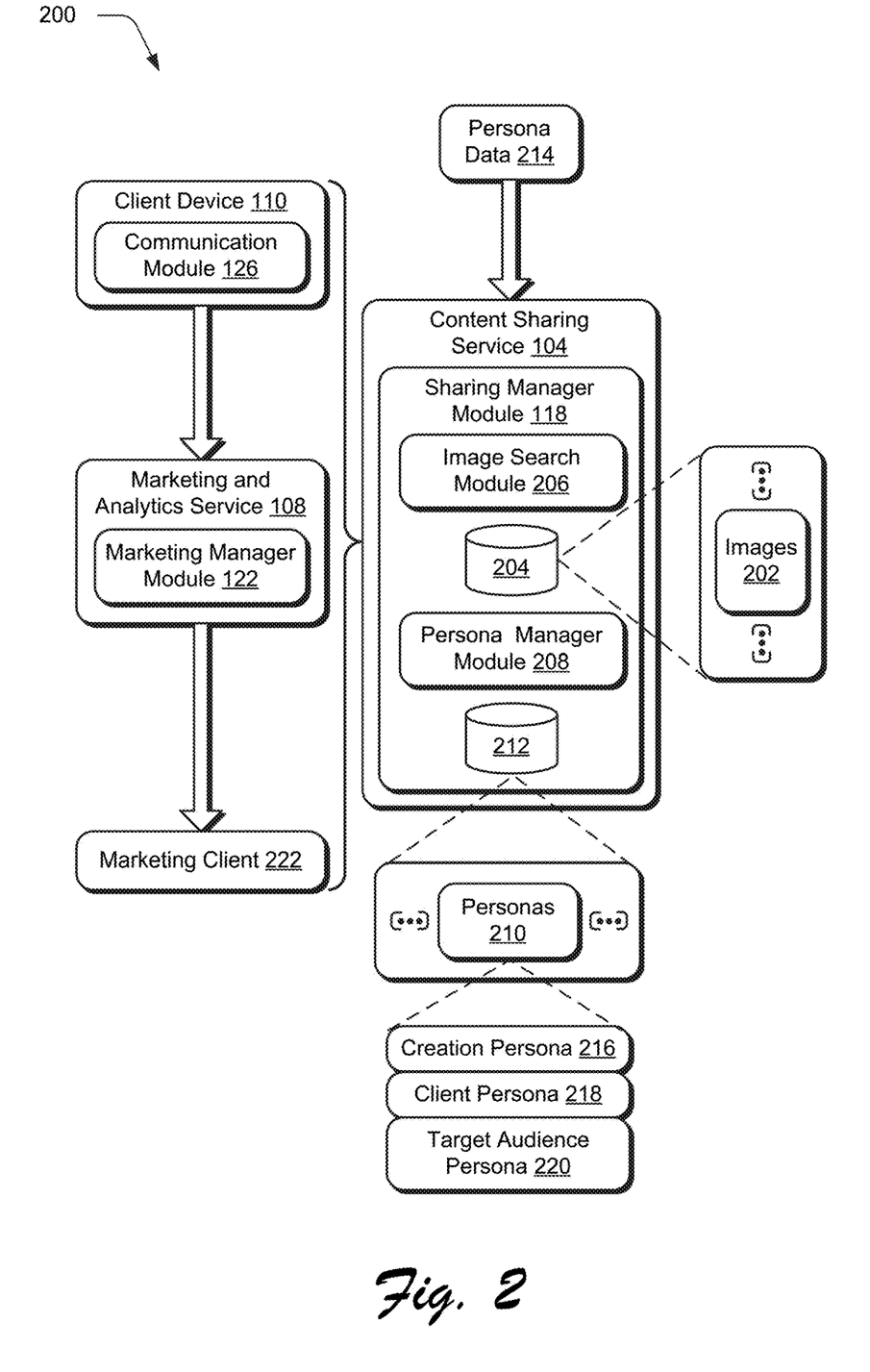
FIG. 2 depicts a system in an example implementation in which a content sharing service of FIG. 1 employs personas as part of a search for images.

FIG. 2 depicts a system in an example implementation in which the content sharing service 104 of FIG. 1 employs personas as part of a search for images. Although this example describes persona functionality as part of the content sharing service 104, this functionality may be implemented by a variety of other entities, such as the content creation service 102, the content social network service 106, the marketing and analytics service 108, and so on. For example, this functionality may be included within and accessible via the content creation service 102 as part of content creation such that a user may obtain access to the images without leaving a context of the content creation service.

The content sharing service 104 includes the sharing manager module 118 which, as previously described, is representative of functionality to manage image 202 sharing and licensing. The images 202 are illustrated as stored in storage 204 of the content sharing service 104 but may also be stored elsewhere, e.g., as part of a third-party storage service, locally by creators of the images 202, and so on.

The sharing manager module 118 includes an image search module 206 that is representative of functionality to perform searches for images 202 of interest. A user, for instance, may initiate a search request that includes one or more keywords that are matched to tags associated with the images 202. For example, a user may input a keyword "meeting" that is then matched to images 202 by the image search module 206 that are tagged with that keyword or a similar keyword. The image search result is then provided by the image search module 206 back to the user for viewing, e.g., by the client device 110 of FIG. 1 through a browser or dedicated application.

However, users that initiate a search request typically have very different expectations as far as which images 202 are desired as part of a search result, even for the same keywords. As shown in an example implementation 400 of FIG. 4, for instance, first and second stages 402, 404 of a user interface 406 are shown. A search input area 408 is illustrated as having a keyword of "meetings" entered by a user, which is then used to obtain images 410, 412, 414 as part of a search result 416. As illustrated, however, an idea of what is a "meeting" may vary greatly, such as a formal meeting in image 410, informal coffee house scene in image 412, and hipsters meeting together in image 414.

Accordingly, the sharing manager module 118 of the content sharing service 104 is illustrated as including a persona manager module 208. The persona manager module 208 is representative of functionality to create, manage, and utilize personas 210 as part of a search for images 202. The personas 210 are illustrated as stored in storage 212 of the content sharing service 104 but as before may be obtained from a variety of different sources as further described in the following.

The personas 210 specify characteristics of the one or more respective users as associated with a demographic of a subset of a user population. These characteristics may then be correlated to expectations of the users as part of a search for images 202. For example, a test group having characteristics consistent with a particular persona 210 may be used to tag images 202 as meeting expectations with regards to which images 210 are viewed as corresponding with that persona 210 for the same or different keywords. Machine learning techniques (e.g., convolutional neural networks, directed graphs, linear regression, neural networks, Support vector machines) may then be employed by the persona manager module 208 to learn models from the test group which are then used as a basis for a persona 210 automatically and without user intervention. The persona 210 (e.g., the model learned via machine learning) may then be applied to other images 202 to determine whether those images 202 are consistent with that persona 210.

In another example, personas are generated by the persona manager module 208 based on persona data 214 that describes individual users. For example, the persona data 214 may describe user interaction with images, such as images created using the content creation service 102, images shared by the content sharing service 104, portfolios exposed as part of the content social network service 106, content used as part of marketing activities of the marketing and analytics service 108 (e.g., collected from social networks by the analytics manager module 124), and so forth. The persona data 214 is then used as a basis for generating a model of the particular users as described above (e.g., machine learning) and/or to assign users to a corresponding one or more of the personas 210, e.g., to one or more pre-modeled personas 210.

A variety of different user population subsets may be represented by personas 210. Examples of personas 210 include personas representing social characteristics (e.g., hipster, businessman), business characteristics (e.g., office worker, artist), age characteristics (e.g., pre-teen, elderly), geographical locale characteristics (e.g., by continent, region of a country), observed user interaction characteristics (e.g., past purchase habits and monitored interactions), and so on. Thus, personas 210 may be generated using a variety of different techniques to represent a variety of different population subsets.

Personas 210 may then be leveraged in a variety of ways as part of an image search performed by the image search module 206 to represent users associated with the search. In one such example, personas 210 are representative of different users associated with a search, such as a creation persona 216, a client persona 218, and a target audience persona 220. A content creation professional, for instance, may employ the client device 110 to interact with the content sharing service 104 via the network 112 of FIG. 1 to originate a search request. As shown at the first stage 402 of FIG. 4, the content creation professional interacts with a user interface 406 to input a keyword "meetings" in a search input area 408.

Figure 4:
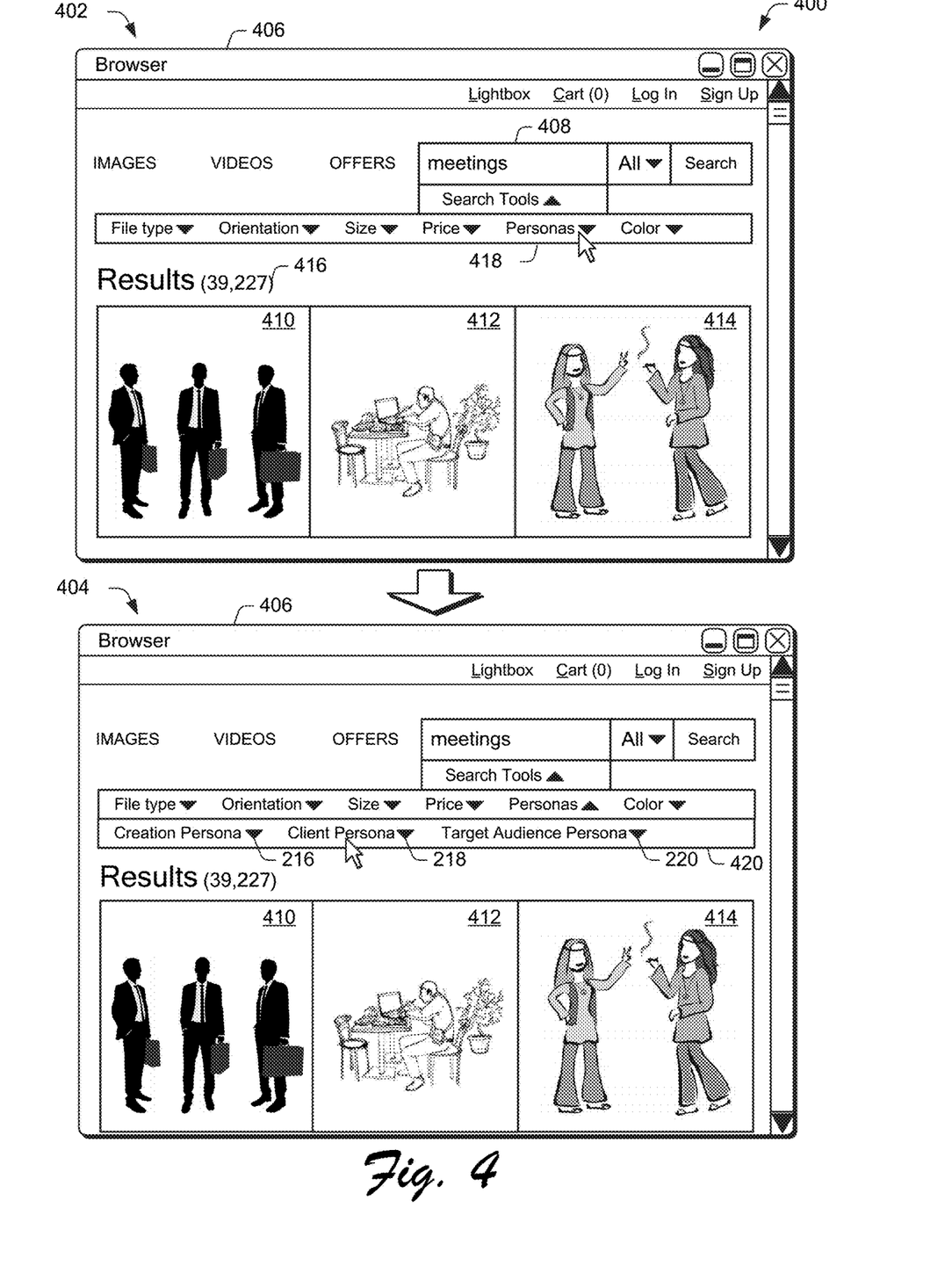
FIGS. 4 and 5 depict examples of user interfaces usable to associate personas as part of a search request.

The keyword is then used by the image search module 206 to locate images 410, 412, 414 as part of a search result 416. As previously described, desired subject matter and the representation thereof may vary greatly even for common keywords, such as to vary from as a formal meeting in image 410, informal coffee house scene in image 412, and hipsters meeting together in image 414.

Because these results may vary so greatly, a user is provided an option 416 to associate one or more personas 210 to filter the search result 416. In the illustrated example, selection of the option 418 causes output of a menu bar 420 listing different types of users that may be associated with a search request that are selectable to associate personas for those users at the second stage 404. Examples include a creation persona 216, a client persona 218, and a target audience persona 220. The creation persona 216 is usable to associate a persona 210 with a content creation professional that is to create the content 116 that may include an image from the search result 416, which in this example originated the search request but other examples are also contemplated.

The client persona 218 is usable to associate a persona 210 with a client that requested creation of the content by the content professional. In one example, a marketing professional may specify characteristics of a marketing campaign for a marketing client 222 through interaction with a marketing and analytics service 108. Accordingly, the marketing professional is in a position to approve or deny the content 116 created by content creation professional. In another example, the client persona 218 is used to represent the marketing client 222 that requested the marketing campaign. By associating a persona 210 with the search request for the client as a client persona 218, a likelihood that the search result 416 will include images desired by the client (e.g., the marketing professional and/or the marketing client 222) is increased by using the persona 210 to represent likes and/or dislikes of the marketing professional.

Figure 5:
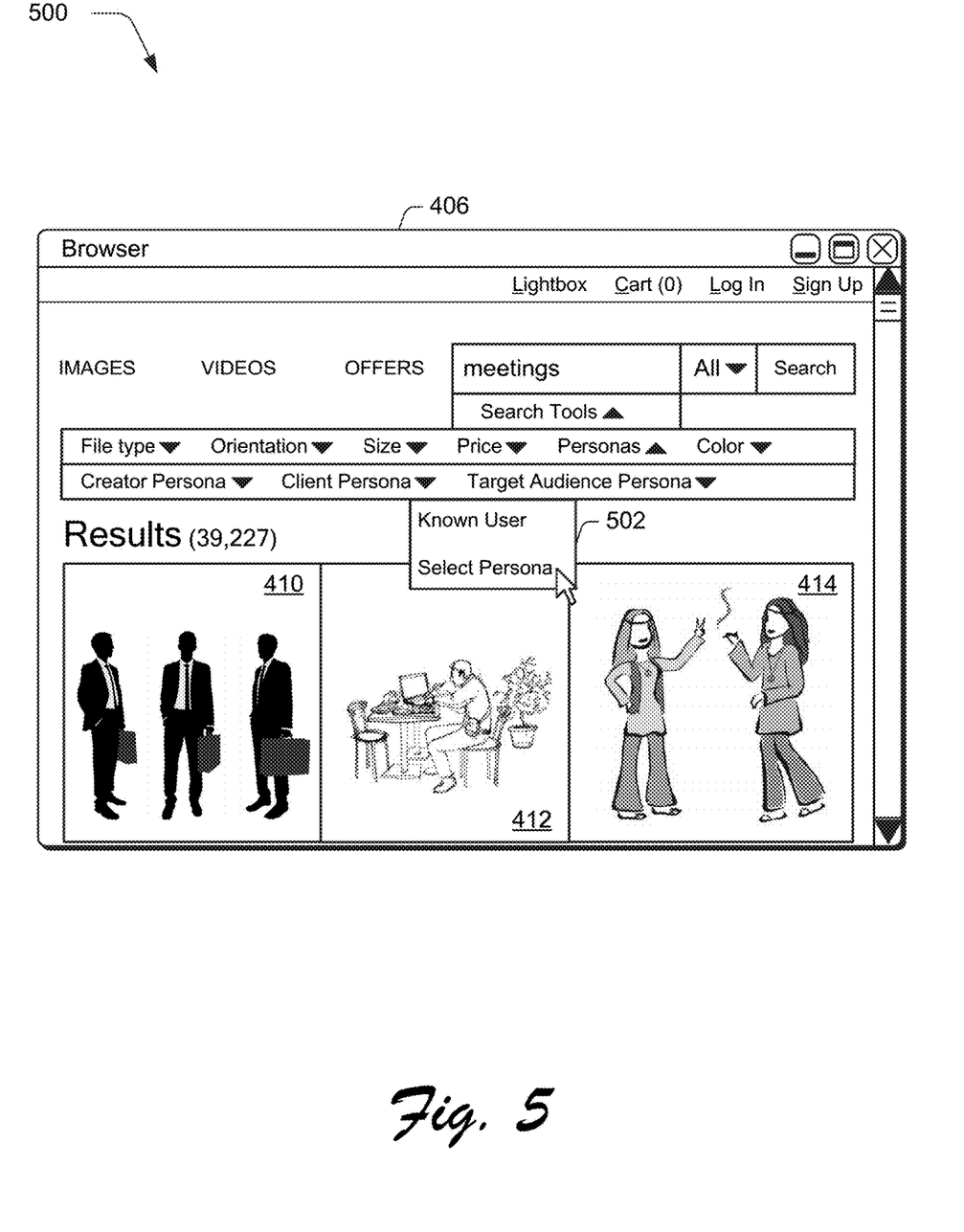

As shown at the second stage 404 of FIG. 4, for instance, a user has selected an option to associate a client persona 218 with the search request. In response, options 502 are output to indicate a known user or select one of a plurality of preconfigured personas as shown in the example implementation of FIG. 5. Continuing with the previous example, an indication of a known user may include selection of a profile used as part of the content creation service 102, content sharing service 104, content social network service 106, and/or marketing and analytics service 108 that is particular to that user. The option to select a persona may be used to select a preconfigured persona, e.g., models based on test groups formed through machine learning above that are not formed directly based on the user.

Likewise, the target audience persona 220 may be utilized to associate a persona 210 that is representative of a target audience that is to consume content that includes the image found via the search. Continuing with the previous marketing example, the target audience persona 220 may be used to associate a persona with a target audience of the marketing campaign. In this way, the persona 210 associated therewith may also be used to represent likes and/or dislikes of potential consumers of the marketing campaign.

Figure 3:
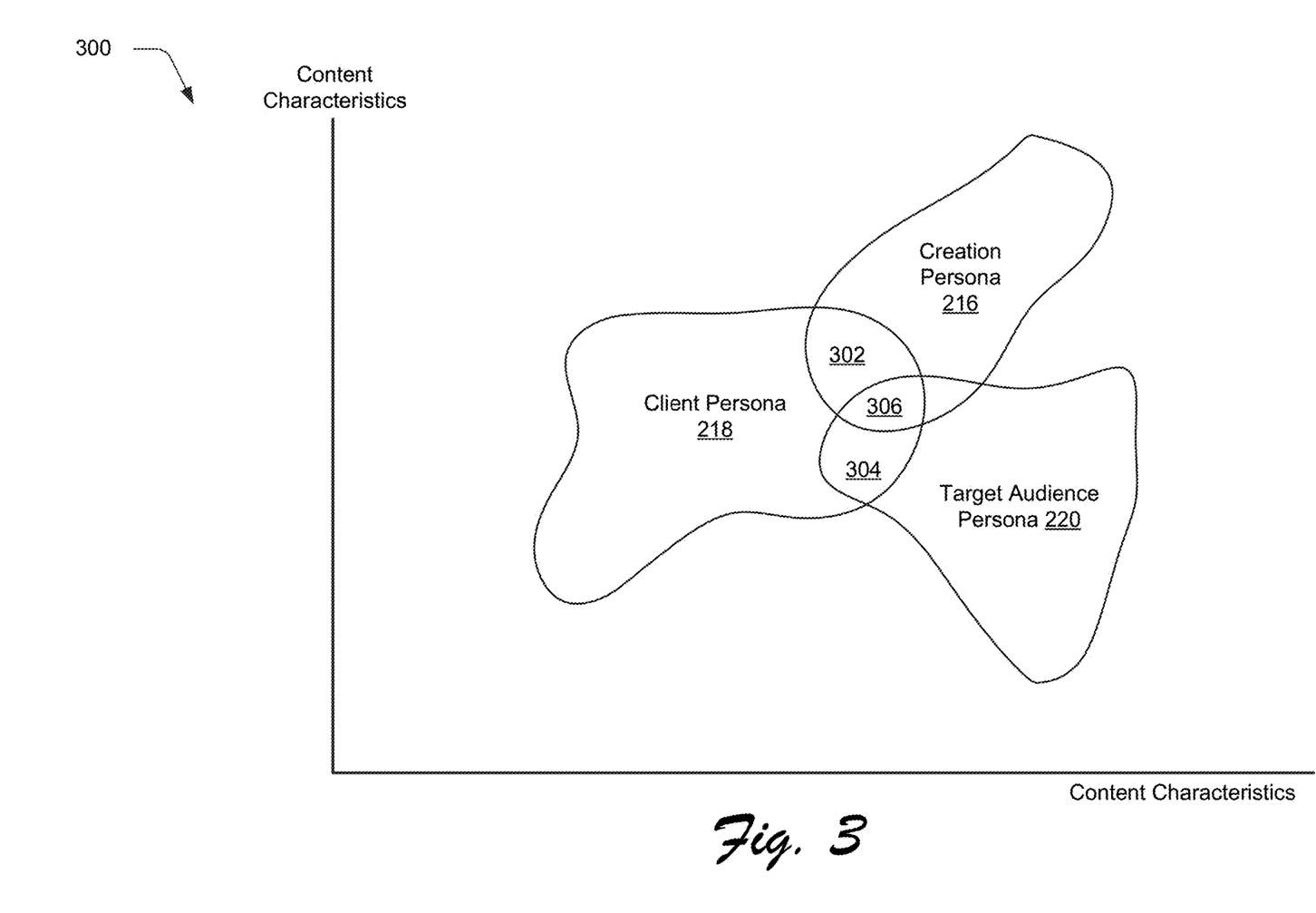
FIG. 3 depicts a graph showing overlap of subject matter of interest of a plurality of personas as associated with a search request.

Accordingly, a plurality of personas may be combined to define common areas of interest with respect to expectations regarding images. As shown in an example implementation of FIG. 3, a graph 300 is shown of content characteristics desired and/or to be avoided by respective client personas 216, 218, 220 are shown. Association of a client and creation personas 216, 218 with a search request defines an overlapping region 302 of common interests. Likewise, association of a client persona 218 and a target persona 220 defines an overlapping region 304 of common interests between those two personas. Continuing with the example of FIGS. 4 and 5, an overlapping region 306 is formed through combination of the creation, client, and target audience personas 216, 218, 220. In this way, a user may associate one or more personas 210 with a search request to increase a likelihood of obtaining images 202 of interest to a plurality of different users, further discussion of which is included in a description of the following procedures.

Example Procedures

The following discussion describes persona techniques and systems that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
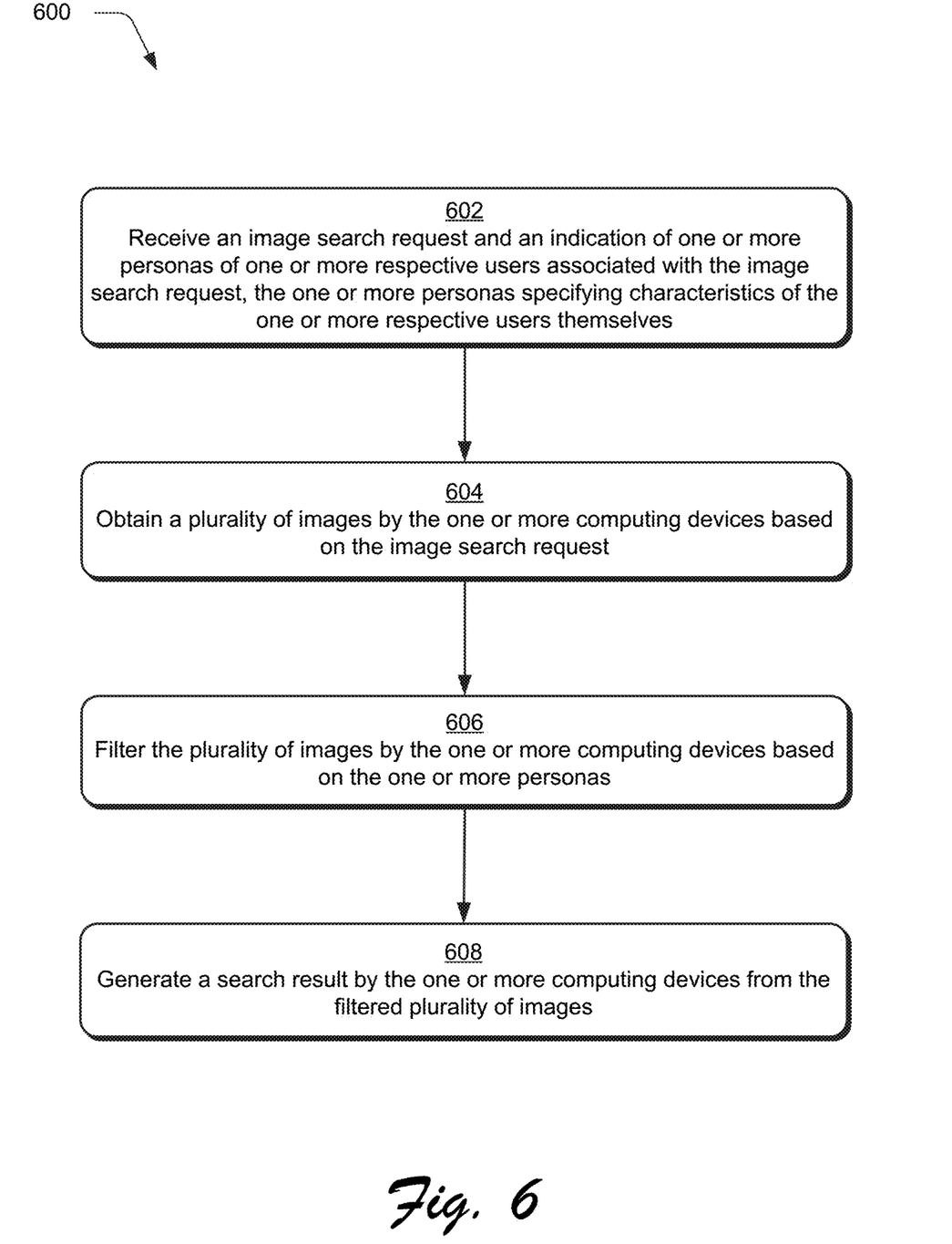
FIG. 6 is a flow diagram depicting a procedure in an example implementation in which a digital medium environment is described for controlling image searches by one or more computing devices.

FIG. 6 depicts a procedure 600 in an example implementation in which a digital medium environment is described for controlling image searches by one or more computing devices. An image search request and an indication of one or more personas of one or more respective users associated with the image search request is received by the one or more computing devices. The one or more personas specify characteristics of the one or more respective users themselves (block 602). A user, for instance, may supply keywords as part of an image search request along with an indication of the personas. In another instance, the keywords are provided first by a user and then subsequent selections are made to associate the personas 210 with the search request.

A plurality of images are obtained by the one or more computing devices based on the image search request (block 604). An image search module 206 of the content sharing service 104, for instance, may obtain images 202 that are available for licensing based on keywords included in the search request.

The plurality of images are filtered by the one or more computing devices based on the one or more personas (block 606). A persona manager module 208 may also apply personas 210 to a search result of the image search module 206 to filter images based on the characteristics of the personas 210, such as personas associated with a creation persona 216, client persona 218, and/or target audience persona 220. In this way, a plurality of personas may be used to achieve an intersection of likes or dislikes of users associated with the search request as described in relation to FIG. 3.

A search result is generated by the one or more computing devices from the filtered plurality of images (block 608), which may then be provided to an originator of the search request for display in a user interface. In one or more implementations, the search result includes an option to license respective images from the content sharing service, e.g., a user selectable button, billing information input option, login to a user account to obtain via a subscription, and so forth. In this way, a likelihood of receiving relevant and desired images is improved through the use of personas 210.

Figure 7:
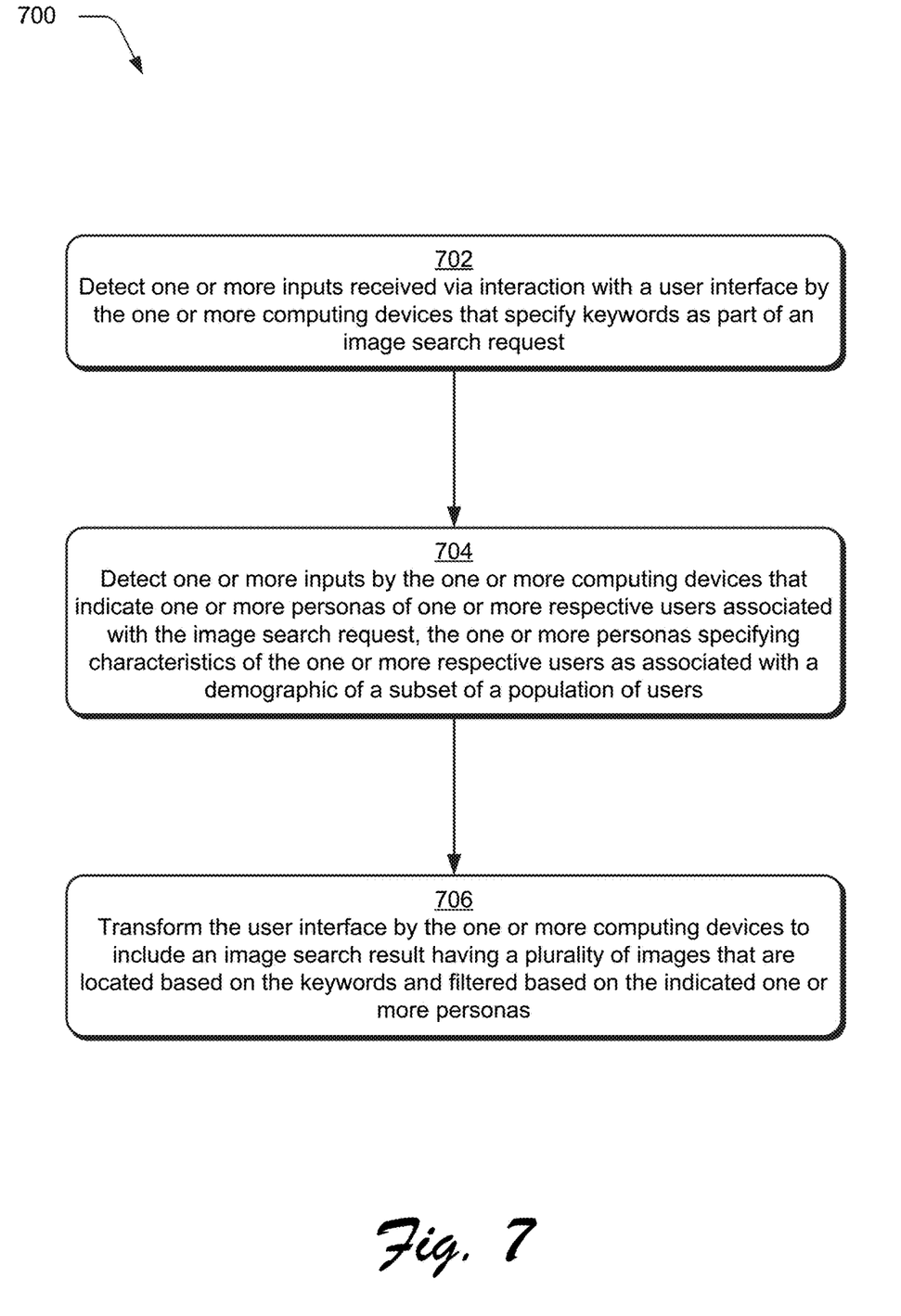
FIG. 7 is a flow diagram depicting another procedure in an example implementation in which a digital medium environment is described for controlling image searches by one or more computing devices.

FIG. 7 depicts another procedure 700 in an example implementation in which a digital medium environment is described for controlling image searches by one or more computing devices. One or more inputs are detected by the one or more computing devices that are received via interaction with a user interface and that specify keywords as part of an image search request (block 702). A communication module 126 of client device 110, for instance, may output a user interface 406 of a browser that is in communication with the content sharing service 104 via the network 112 as shown in FIG. 4. The user interface 406 includes a search input area 408 via which a user may enter keywords that are used to perform a search as described above.

One or more inputs are also detected by the one or more computing devices that indicate one or more personas of one or more respective users associated with the image search request. The one or more personas specify characteristics of the one or more respective users as associated with a demographic of a subset of a population of users (block 704). Continuing with the previous example, a user may specify personas that are to be associated with the search, such as initially when entering the keywords or to further refine a search result.

The user interface is transformed by the one or more computing devices to include an image search result having a plurality of images that are located based on the keywords and filtered based on the indicated one or more personas (block 706). Search results 416, for instance, may then be output in the user interface 406 as received from the content sharing service 104, may be refined based on the personas, and so forth. A variety of other examples are also contemplated as described above.

Example System and Device

Figure 8:
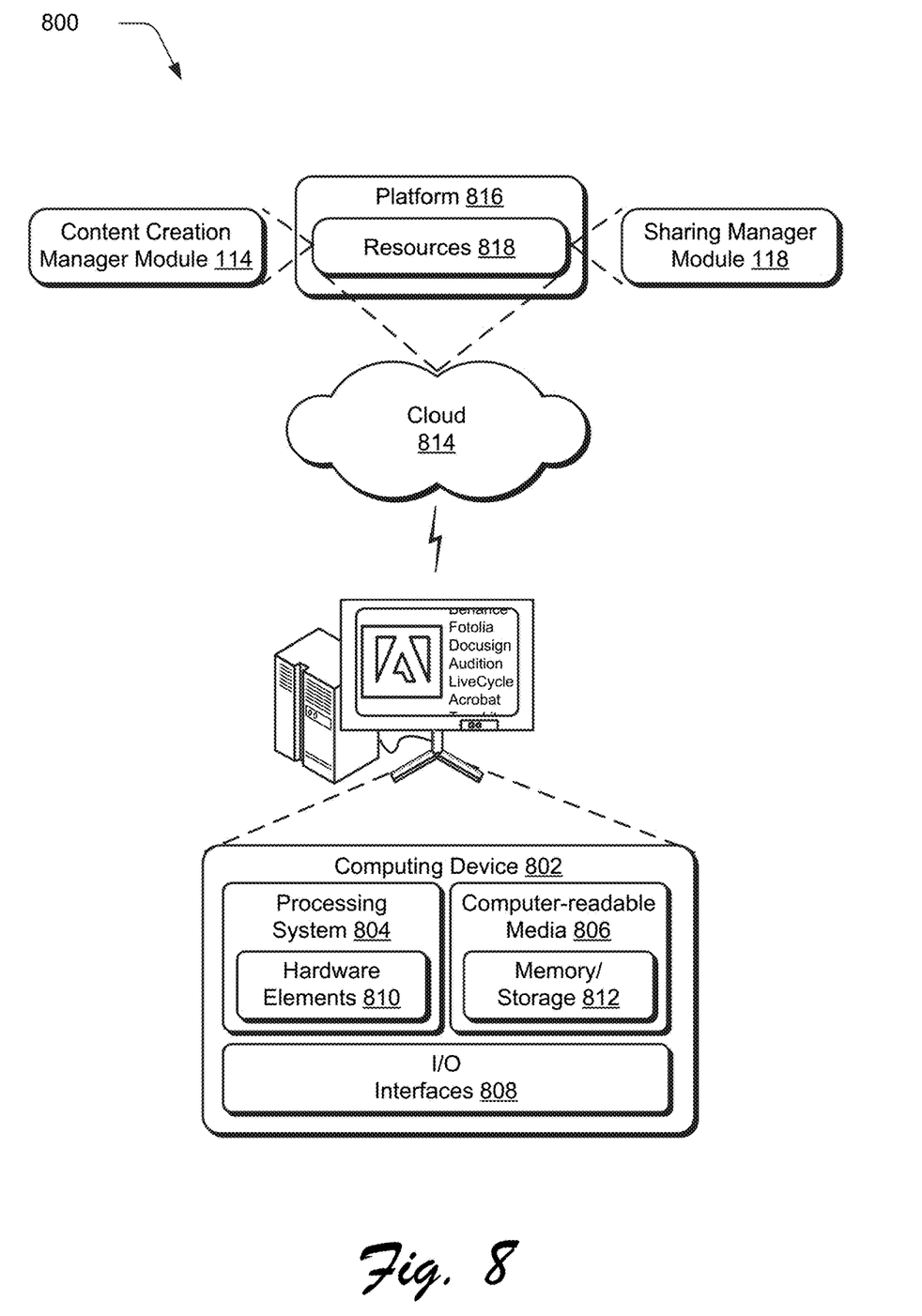
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the sharing manager module 118. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for controlling image searches by one or more computing devices, a method comprising:
   receiving, by the one or more computing devices, an image search request including a keyword and a persona, the image search request associated with a user, the persona specifying content consumption characteristics of one or more respective users associated with a demographic of a subset of a user population that does not include the user to identify likes and dislikes of the population in regards to images presented for consumption;

obtaining a plurality of images by the one or more computing devices based on the keyword;

filtering the plurality of images by the one or more computing devices based on the consumption characteristics specified by the persona; and generating a search result by the one or more computing devices from the filtered plurality of images.

2. A method as described in claim 1, wherein the persona is generated for the one or more respective users automatically and without user intervention by at least one computing device based on monitored user interaction of the one or more respective users.

3. A method as described in claim 1, wherein the monitored user interaction includes interaction with a content creation service configured to create the content or a content sharing service that is configured to make the plurality of images available for use via a license.

4. A method as described in claim 1, wherein the persona includes at least one of:

a creation persona of the one or more respective users that is to create content that includes an image based on the image search request;

a client persona of the one or more respective users that requested the creation of the content; and a target audience persona of the one or more respective users that is to consume the created content.

5. A method as described in claim 4, wherein the image search request includes the creation persona, the client persona, and the target audience persona, and wherein the filtering includes:

filtering the plurality of images based on the consumption characteristics specified by the creation persona;

filtering the plurality of images based on the consumption characteristics specified by the client persona; and filtering the plurality of images based on the consumption characteristics specified by the target audience persona.

6. A method as described in claim 1, wherein the plurality of images are available for licensing from a content sharing service.

7. A method as described in claim 6, wherein the generated search result includes an option to license respective said images from the content sharing service.

8. A method as described in claim 1, wherein the image search request is formed through interaction with a user interface of a content creation service configured to create content that includes images and the generated search result is configured for display within the user interface such that a user interacting with the user interface remains in a context of the user interface to form the image search request and display the generated search result.

9. A method as described in claim 1, wherein the persona specifies the content consumption characteristics based on social characteristics, type of job, age demographic, geographical local, past purchase habits, or monitored interactions.

10. In a digital medium environment for controlling image searches by one or more computing devices, a method comprising:

detecting one or more inputs received via interaction with a user interface by the one or more computing devices that specify an image search request including a keyword and a persona, the persona including at least one of:

a creation persona of a user that is to create content that includes an image based on the image search request;

a client persona of a user that requested the creation of the content; and a target audience persona of a user that is to consume the created content;

specifying, based on the persona, content consumption characteristics of one or more respective users as associated with a demographic of a subset of a population of users to identify likes and dislikes of the population in regards to images presented for consumption; and transforming the user interface by the one or more computing devices to include an image search result having a plurality of images that are located based on the keywords and filtered based on the consumption characteristics specified by the persona.

11. A method as described in claim 10, wherein the plurality of images are available for licensing from a content sharing service and the user interface includes functionality to create content to include one or more of the plurality of images.

12. A method as described in claim 10, wherein the creation persona, the client persona, and the target audience persona are each generated for one or more respective users automatically and without user intervention by at least one computing device based on monitored user interaction of the respective said users.

13. A method as described in claim 12, wherein the monitored user interaction includes interaction with a content creation service configured to create the content or a content sharing service that is configured to make the plurality of images available for use via a license.

14. A method as described in claim 10, wherein the creation persona, the client, persona, and the target audience persona are each preconfigured, wherein the personas specify the content consumption characteristics based on social characteristics, type of job, age demographic, geographical local, past purchase habits, or monitored interactions.

15. A method as described in claim 10, wherein the image search request is associated with a user, and wherein the persona specifies content consumption characteristics of a subset of a user population that does not include the user.

16. In a digital medium environment for controlling image searches of a content sharing service, a system comprising:

a hardware processor;

memory coupled to the hardware processor and including instructions that are executable by the hardware processor to implement:

an image search module to receive an image search request including a keyword and a persona and obtain a plurality of images from the content sharing service based on the keyword and an availability for licensing of each respective one of the plurality of images; and a persona manager module to filter the plurality of images for inclusion in the image search result based on content consumption characteristics specified by the persona and indicating one or more respective users as associated with a demographic of a subset of a population of users to identify likes and dislikes of the population in regards to images presented for consumption.

17. A system as described in claim 16, wherein the persona is generated for the one or more respective users automatically and without user intervention by at least one computing device based on monitored user interaction of the respective said users.

18. A system as described in claim 16, wherein the persona is preconfigured.

19. A system as described in claim 16, wherein the persona includes at least one of:
 a creation persona of the one or more respective users that is to create content that includes an image based on the image search request;
 a client persona of the one or more respective users that requested the creation of the content; and
 a target audience persona of the one or more respective users that is to consume the created content.

20. A system as described in claim 16, wherein the search result includes an option to license respective said images.

21. A system as described in claim 16, wherein the persona specifies the content consumption characteristics based on social characteristics, type of job, age demographic, geographical local, past purchase habits, or monitored interactions.

\* \* \* \* \*

UNITED STATES PATENT AND TRADEMARK OFFICE
CERTIFICATE OF CORRECTION

PATENT NO. : 10,592,548 B2
APPLICATION NO. : 14/828085
DATED : March 17, 2020
INVENTOR(S) : Zeke Koch et al.

It is certified that error appears in the above-identified patent and that said Letters Patent is hereby corrected as shown below:

In the Claims

Column 14, Line 16, delete "keywords", insert -- keyword --, therefor.

Column 14, Line 35, after "client", delete ",", therefor.

Signed and Sealed this
Twelfth Day of May, 2020

Andrei Iancu
*Director of the United States Patent and Trademark Office*